US006580561B2

(12) United States Patent
Crouch et al.

(10) Patent No.: US 6,580,561 B2
(45) Date of Patent: Jun. 17, 2003

(54) QUASI-OPTICAL VARIABLE BEAMSPLITTER

(75) Inventors: David D. Crouch, Corona, CA (US); William E. Dolash, Montclair, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/938,116

(22) Filed: Aug. 23, 2001

(65) Prior Publication Data

US 2003/0043466 A1 Mar. 6, 2003

(51) Int. Cl.[7] ............................................... G02B 27/10
(52) U.S. Cl. ...................... 359/618; 359/629; 359/636; 359/196
(58) Field of Search ................................ 359/196–199, 359/203, 209, 212, 232, 236, 618, 629, 634, 636, 638; 342/153, 359, 432; 343/761, 762, 767–71

(56) References Cited

U.S. PATENT DOCUMENTS

| | | | | | |
|---|---|---|---|---|---|
| 2,990,526 A | | 6/1961 | Shelton, Jr. | ................. | 333/252 |
| 3,050,699 A | | 8/1962 | Marcatili et al. | ........... | 333/122 |
| 4,255,752 A | * | 3/1981 | Noble et al. | ................ | 343/771 |
| 5,592,185 A | * | 1/1997 | Itabashi et al. | ............. | 343/794 |
| 6,081,237 A | * | 6/2000 | Sato et al. | .................. | 343/713 |
| 6,083,344 A | * | 7/2000 | Hanawa et al. | ............. | 156/345 |

OTHER PUBLICATIONS

XR000368731 May 05, 1993 Te–Kao Wu: "Quasi Optical Grids With. .,".

XP010293221 Jul. 06, 1998 Krupa, R. et al. "Balanced Calibration Technique with an internal...".

* cited by examiner

*Primary Examiner*—Jordan M. Schwartz
*Assistant Examiner*—Jessica Stultz
(74) *Attorney, Agent, or Firm*—Thomas J. Finn; Colin M. Raufer; Glenn H. Lenzen, Jr.

(57) ABSTRACT

A variable beamsplitter (10) for use with quasi-optical millimeter-wave beams. The beamsplitter (10) consists of a circular metal plate (20) into which a periodic array (30) of rectangular slots is cut. The plate (20) is arranged so that the incident millimeter-wave beam is incident at an angle of 45° relative to the surface of the plate (20). The polarization of the incident beam is parallel to the surface of the plate (20). When the orientation of the plate (20) is such that the electric field is perpendicular to the slots (i.e., the electric field is directed across the narrow dimension of the slots), the plate (20) transmits nearly 100% of the incident power. If the plate is rotated about its axis by 90° (while maintaining a 45° angle between the incident beam and the plate) so that the incident electric field is parallel to the slots, then the plate (20) transmits 0% and reflects nearly 100% of the incident power at an angle of 90° relative to the incident beam. By varying the angle of rotation between 0° and 90°, both the reflected and transmitted power can be varied continuously between 0% and 100% of the incident power.

24 Claims, 10 Drawing Sheets

FIG. 8a
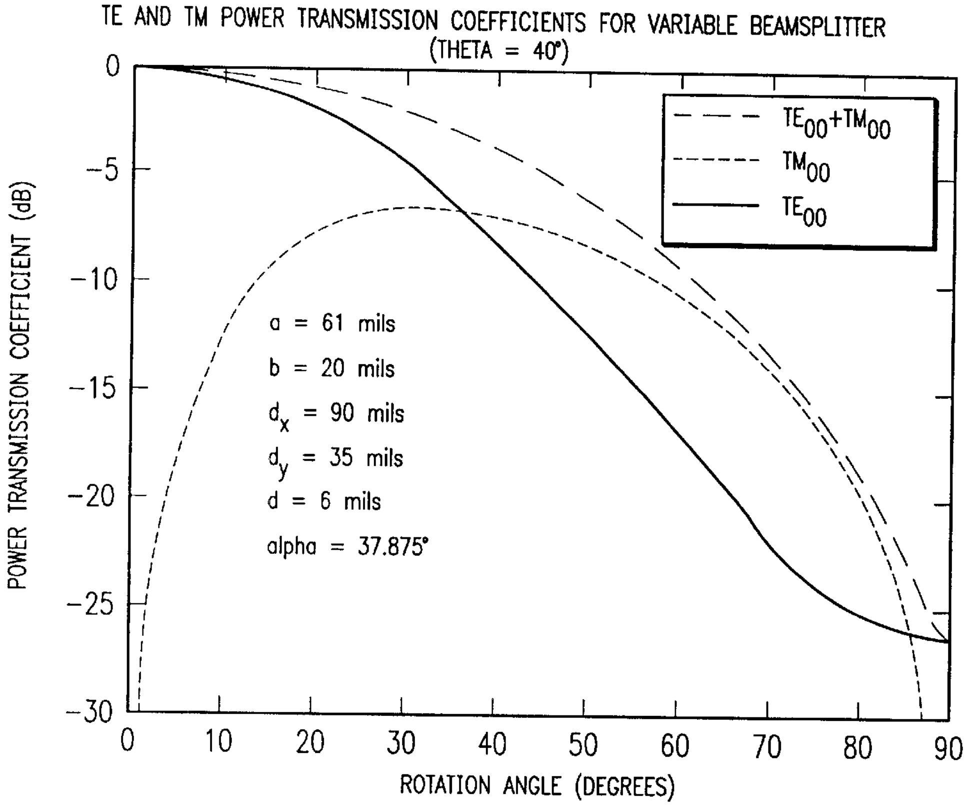
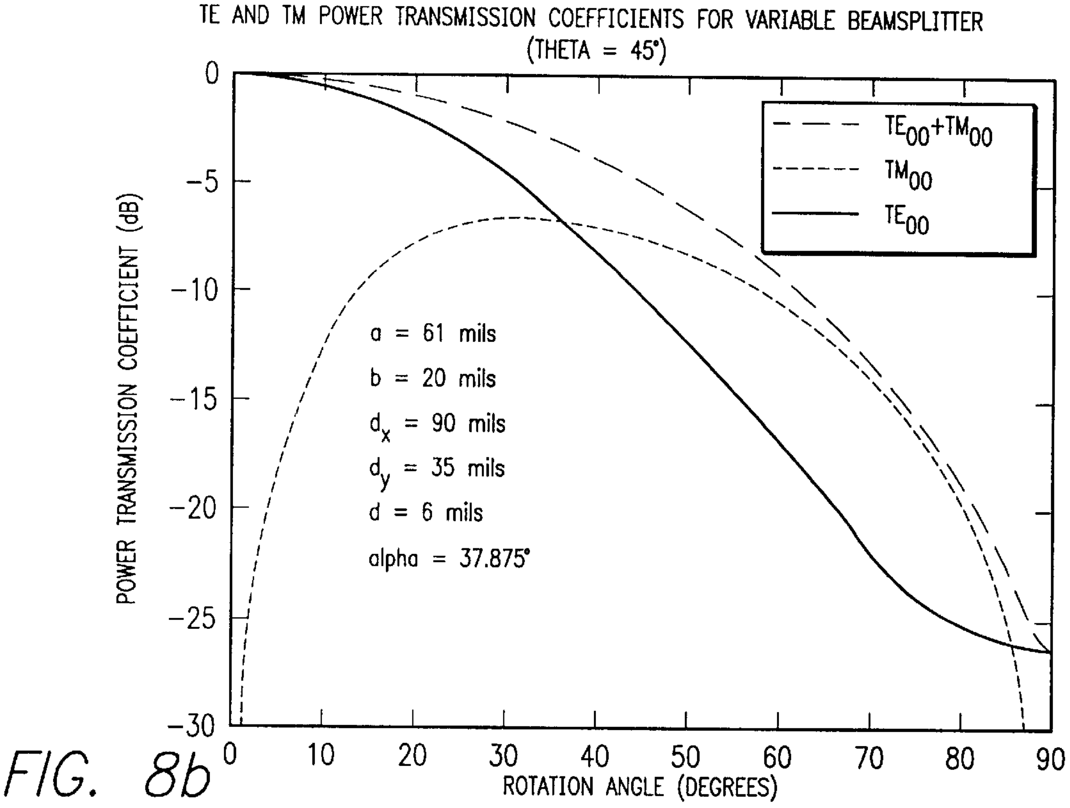
FIG. 8b

FIG. 8c
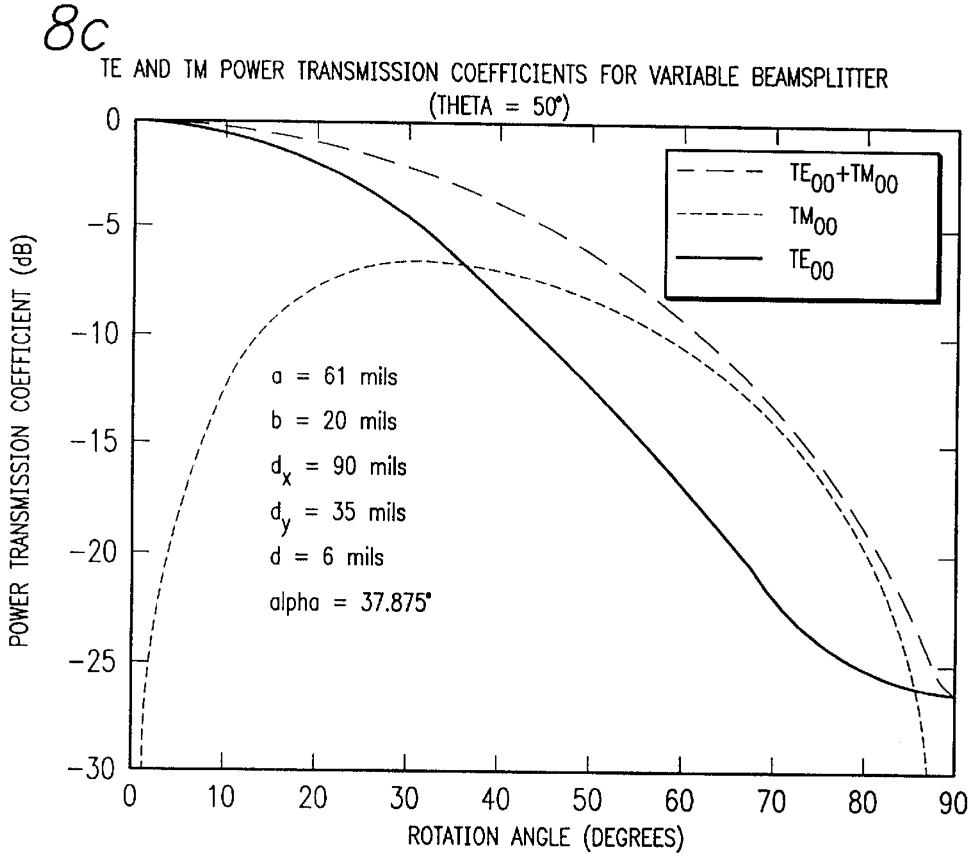
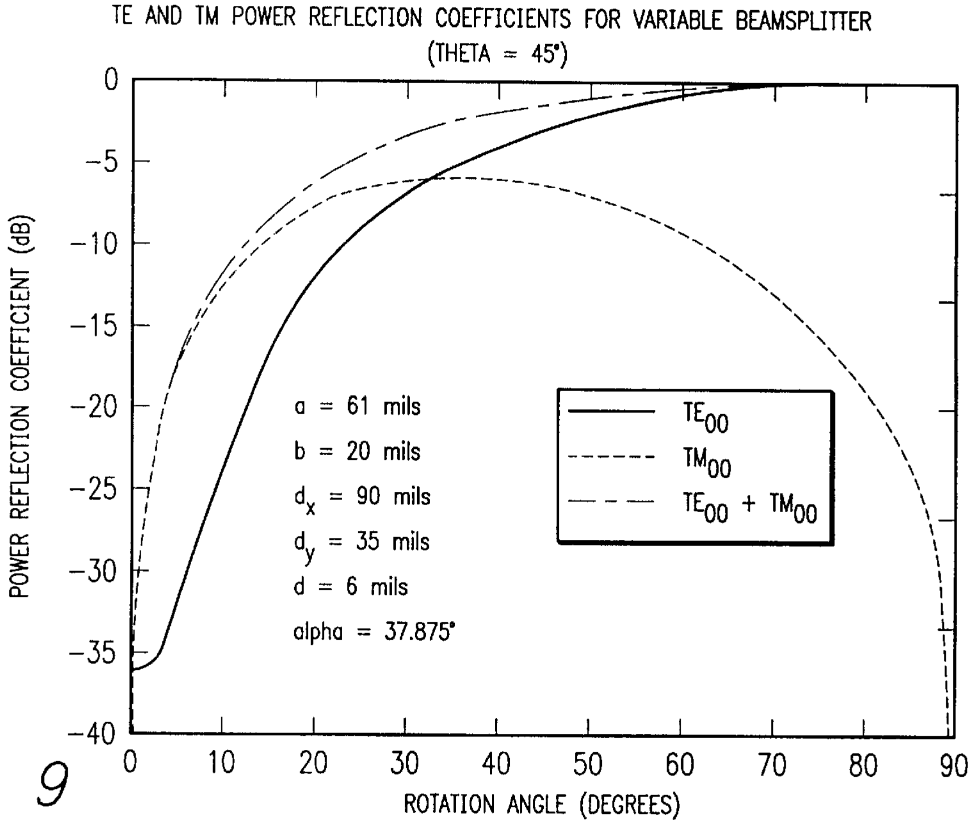
FIG. 9

QUASI-OPTICAL VARIABLE BEAMSPLITTER

BACKGROUND OF THE INVENTION

1. Field of the Invention

The present invention relates to methods and apparatus for directing and controlling electromagnetic power. More specifically, the present invention relates to variable power dividers, beamsplitters and etc.

2. Description of the Related Art

For a variety of applications, there is a ongoing need for systems and methods for directing and controlling electromagnetic power at higher power levels and higher frequencies. For example, there is an ongoing need to effect power division at millimeter wave frequencies (30–300 gigahertz) with quasi-optical Gaussian beams carrying more than 100–1000 kilowatts of power. The known prior art in quasi-optical millimeter-wave power division is the wire-grid variable power divider, typically constructed from a closely-spaced array of tightly-stretched parallel wires. Wire grid variable power dividers are common components in many quasi-optical millimeter-wave systems. At low power levels, the heat generated in each wire by the current induced by the incident beam is inconsequential. At sufficiently high power levels, the absorbed heat may cause mechanical failure of the tightly-stretched wires.

For example, the fractional power absorbed by a low-loss wire-grid variable power divider, when aligned to reflect 100% of the incident power, can be as low as 0.001; i.e., for every kilowatt of power carried by the incident beam, the power divider will absorb at least 1 Watt. If the incident beam carries 1 MW, the power divider will absorb at least 1.0 kW, and if the incident beam carries 5 MW, the power divider will absorb at least 5 kW. A wire grid variable power divider may not be able to dissipate this amount of heat, as the ability of the wires comprising the wire grid to dissipate the absorbed power is seriously restricted by their narrow cross section and consequent low thermal conductance.

Hence, a need remains in the art for a system or method for effecting power division in high power, high frequency applications.

SUMMARY OF THE INVENTION

The need in the art is addressed by the system and method for effecting variable power division of the present invention. The inventive system includes a conductive plate having a plurality of slots therein. The slots are arranged in a periodic array to transmit, at a first level, electromagnetic waves incident on the plate at a predetermined angle and polarization when the slots are oriented at a first angle relative to an axis of the plate and to reflect, at a second level, the electromagnetic waves incident on the plate; at the predetermined angle when the slots are oriented at a second angle and polarization relative to the axis of the plate. A support mechanism is provided to maintain the plate at a fixed angle relative to the direction of propagation of the incident electromagnetic waves, and means are provided for removing heat absorbed from the incident electromagnetic waves from the edge of the plate.

The invention is adapted for use with an arrangement for rotating the plate from the first orientation angle to the second orientation angle relative to the axis of the plate. In a specific application, the invention is implemented as a variable beamsplitter for use with quasi-optical millimeter-wave beams. The beamsplitter consists of a circular metal plate into which a periodic array of rectangular slots is cut. The plate is arranged so that the incident millimeter-wave beam is incident at an angle of 45° relative to the surface of the plate. Furthermore, the polarization of the incident beam is parallel to the surface of the plate. When the orientation of the plate is such that the electric field of the incident beam is perpendicular to the slots (i.e., the electric field is directed across the narrow dimension of the slots), the plate transmits nearly 100% of the incident energy. If the plate is rotated about its axis by 90° (while maintaining a 45° angle between the incident beam and the plate) so that the incident electric field is parallel to the slots (i.e. the electric field is directed across the wide dimension of the slots), then the plate transmits 0% and reflects nearly 100% of the incident energy at an angle of 90° relative to the incident beam. By varying the angle of rotation between 0° and 90°, both the reflected and transmitted power can be varied continuously between 0% and 100% of the incident power.

A novel feature of the invention derives from the use of a slotted plate as a variable beamsplitter for a quasi-optical millimeter-wave beam and its use of the dependence of the reflection and transmission coefficients on the angle between the incident electric field and the axes of the slots, allowing the reflected and transmitted power to be varied continuously by rotating the plate about its axis.

BRIEF DESCRIPTION OF THE DRAWINGS

FIG. 8*a* is a graph showing power transmission coefficients for the variable beamsplitter of the illustrative embodiment as a function of rotation angle for a TE wave incident at an angle of 40° at an operating frequency of 95 GHz.

FIG. 8*b* is a graph showing power transmission coefficients for the variable beamsplitter of the illustrative embodiment as a function of rotation angle for a TE wave incident at an angle of 45° at an operating frequency of 95 GHz.

FIG. 8*c* is a graph showing power transmission coefficients for the variable beamsplitter of the illustrative embodiment as a function of rotation angle for a TE wave incident at an angle of 50° at an operating frequency of 95 GHz.

FIG. 9 is a graph showing power reflection coefficients for the variable beamsplitter of the illustrative embodiment as a function of rotation angle for a TE wave incident at an angle of 45° at an operating frequency of 95 GHz.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
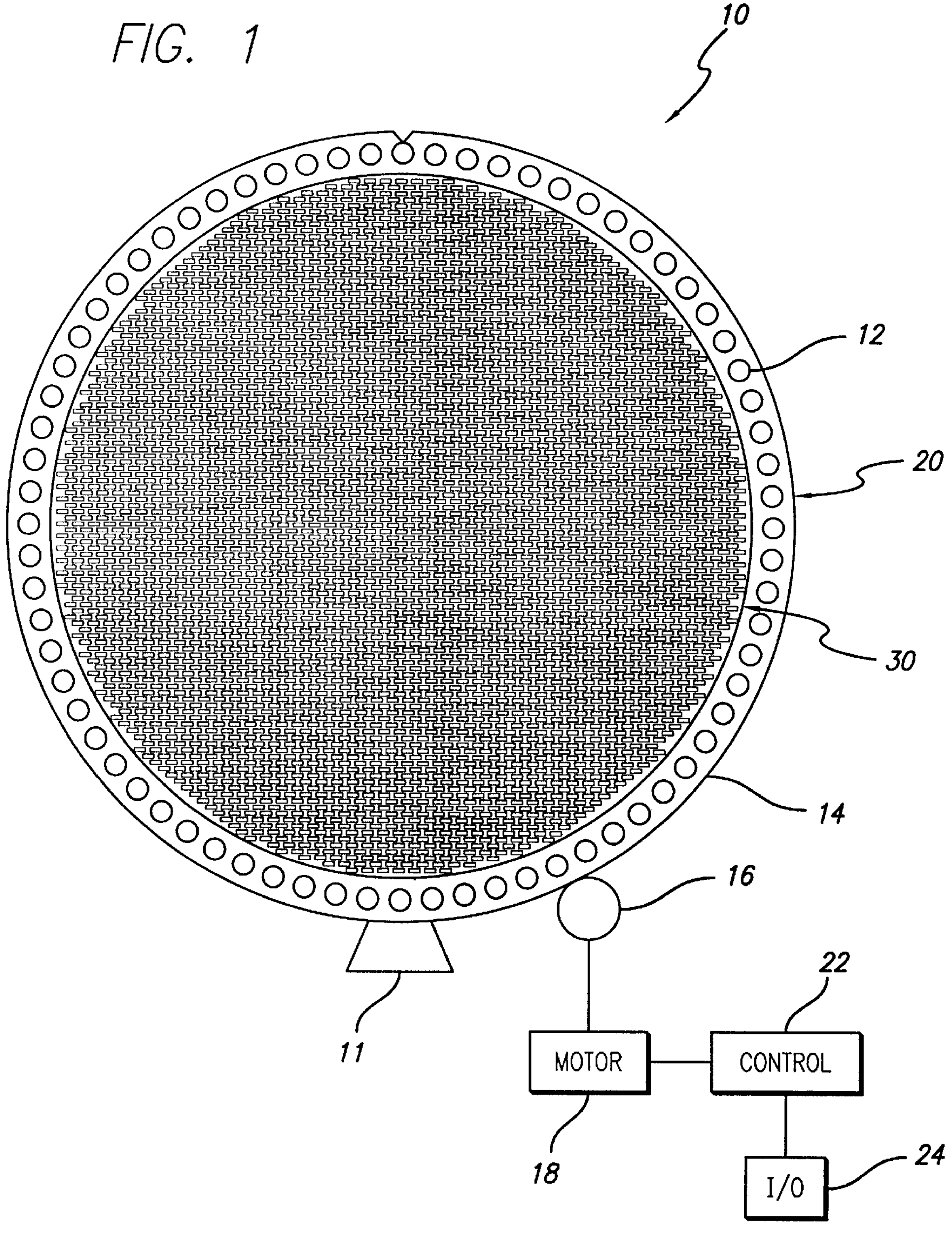
FIG. 1 is a front view of an illustrative implementation of a variable beamsplitter adapted for use with quasi-optical millimeter-wave beams in accordance with the present teachings.

FIG. 1 is a front view of an illustrative implementation of a variable beamsplitter adapted for use with quasi-optical millimeter-wave beams in accordance with the present teachings. The inventive beamsplitter 10 consists of a circular metal plate 20 perforated by a periodic array 30 of rectangular slots. The plate is mounted on a support 11 and maintained thereby at a desired angle relative to an incident beam. The plate 20 is fabricated of beryllium copper or other material suitably conductive for a specific application. In the illustrative implementation, the plate 20 has a diameter of 4.5" and a thickness of 6 mils. The illustrative beamsplitter 10 described herein is a low-cost device, suitable for low to medium power applications. The thinness of the plate 20 makes it possible to construct a device using chemical machining, which is an inherently low-cost process. For high-power applications, a thicker material will likely be required to provide a thermal conductance sufficiently high to allow the escape of heat absorbed from the incident beam due to the finite electrical conductivity of the plate material, and means provided for removing the heat from the edge of the plate. If the material is too thick, however, chemical machining cannot be used since the slot dimensions will vary with depth into the plate. In this case, electro-discharge machining (EDM) can be used.

In FIG. 1, the plate 20 is shown with reference holes 12 every 5° along the edge to allow accurate angular positioning. However, in the best mode, gears 14 are provided about the periphery of the plate 20. The gears 14 are adapted to be engaged by a pinion gear 16. The pinion gear 16 is driven by a stepper motor 18 in response to commands provided by a controller 22 and a user interface 24.

The operating frequency of the beamsplitter 10 is determined by the dimensions of the slots, the periodicity of the array, and the thickness of the plate. The power-handling capacity of the beamsplitter 10 is determined by the thermal conductance of the plate, which is determined by its thickness. For high-power applications, means must be provided to remove the absorbed heat from the edge of the plate. FIG. 2*a* shows an illustrative implementation of such a means.

FIG. 2*a* is an isometric view of an illustrative implementation of a cooling system for a high-power variable beamsplitter 10 implemented in accordance with the present teachings. As shown in FIG. 2*a*, a cooling jacket 26 is attached to the edge of the plate 20 and water or some other suitable coolant enters through a coolant inlet 27, flows clockwise through the cooling jacket 26, and exits at the coolant outlet 28.

Figure 2B:
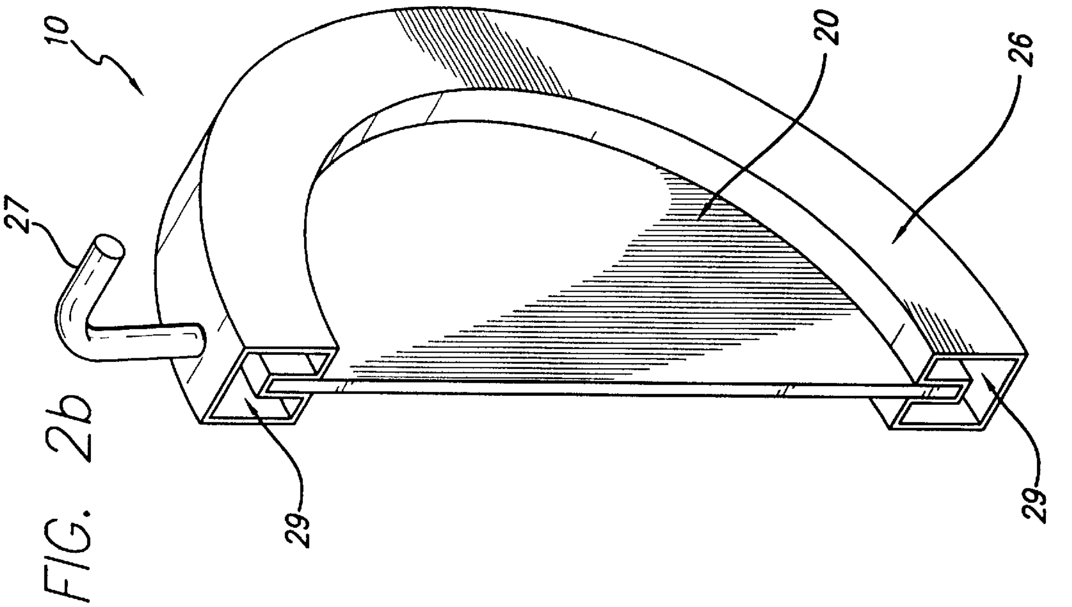
FIG. 2*b* is a cut-away view of the cooling system depicted in FIG. 2*a*.
Figure 2A:
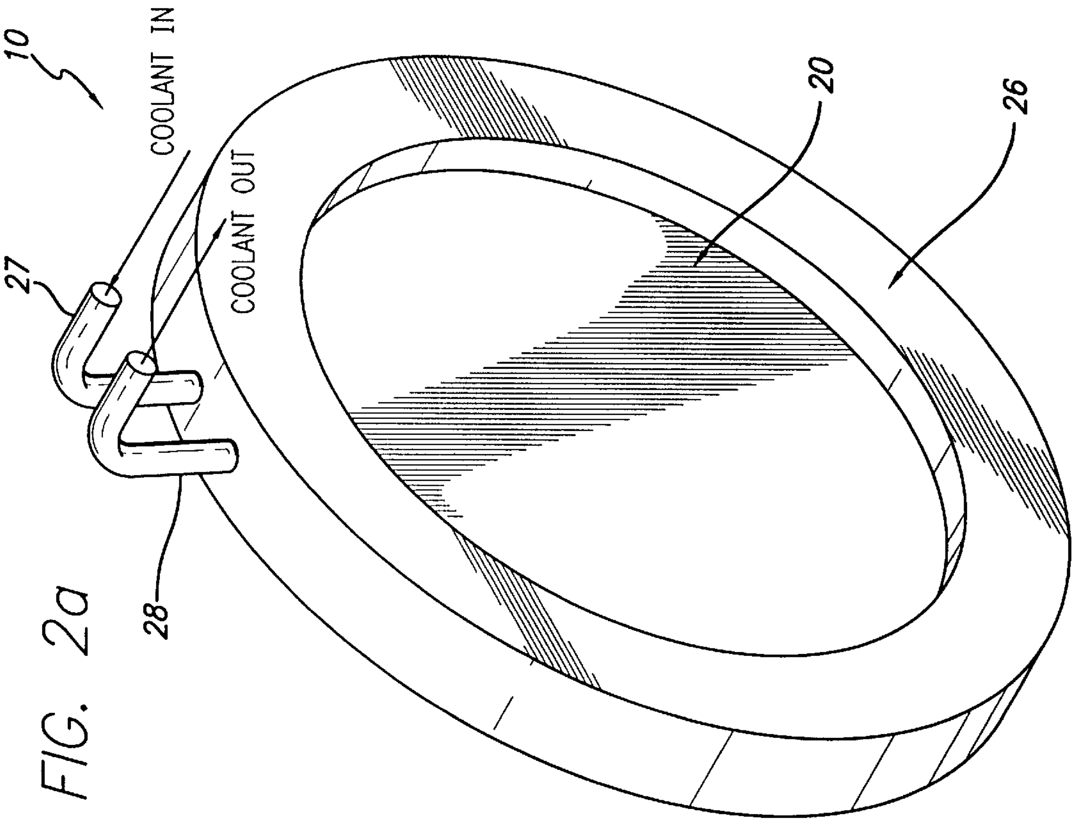
FIG. 2*a* is an isometric view of an illustrative implementation of a cooling system for a high-power variable beamsplitter implemented in accordance with the present teachings.

FIG. 2*b* is a cut-away view showing the details of the cooling channel 29 contained within the cooling jacket 26. To allow rotation of the beamsplitter 10 about its axis by angles between 0° and 90° flexible tubing (not shown) is used to deliver the coolant to the coolant inlet 27 and remove coolant from the coolant outlet 28.

Figure 3:
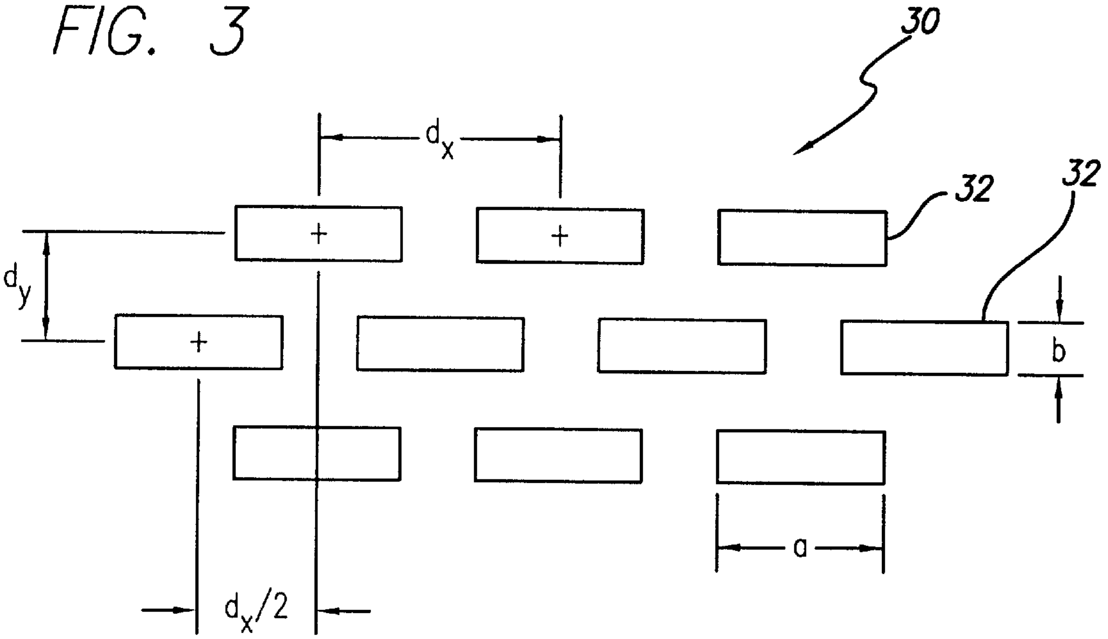
FIG. 3 is a magnified view of a portion of the slot array of the beamsplitter depicted in FIG. 1.

FIG. 3 is a magnified view of a portion of the slot array of the beamsplitter depicted in FIG. 1. As shown in FIG. 3, the slots 32 are rectangular in shape and arranged in an isosceles triangular pattern. The slots may be chemically machined into the plate 20. Those skilled in the art will appreciate that the present teachings are not limited to the shape or number of slots in the array nor the manner by which the slots are created.

Figure 4:
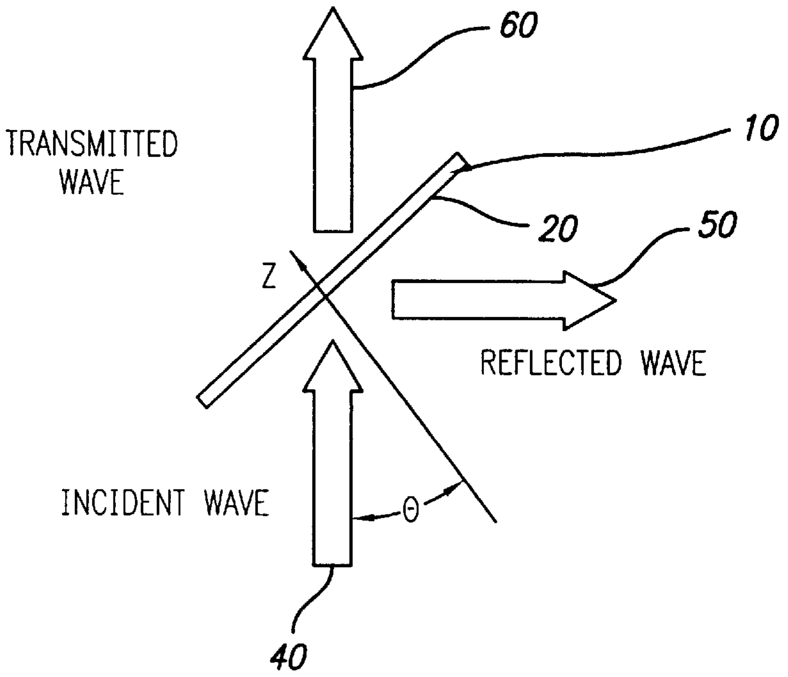
FIG. 4 is a top view of the variable beamsplitter and the incident, reflected, and transmitted waves.

To avoid grating lobes, the following conditions should be satisfied when the slots are arranged in an isosceles triangular pattern:

$$2\frac{\lambda}{d_x} \geq 1 + \sin\theta, \quad \frac{\lambda}{d_y} \geq 1 + \sin\theta$$

and $$\left(\frac{\lambda}{d_x}\right)^2 + \left(\frac{\lambda}{2d_y}\right)^2 \geq (1 + \sin\theta)^2.$$

where:

$d_x$=array period along x axis;

$2d_y$=array period along y axis;

$\lambda$=wavelength of the incident electromagnetic waves; and $\theta$=angle of incidence (see FIG. 4).

In the illustrative implementation, the slot dimensions are 61 mils in length, 20 mils in height. That is, a=61 mils and b=20 mils. The dimensions of the array in the x and y directions are $d_x$=90 mils and $d_y$=35 mils (the period in the y-direction is $2\times d_y$=70 mils), respectively, and the thickness of the plate is d=6 mils. The angle between nearest-neighbor slots is $\alpha=\tan^{-1}(2dy/dx)=37.875°$. The period is 90 mils in the horizontal direction and 70 mils in the vertical direction. With these values of $d_x$ and $d_y$ no grating lobes can exist for an angle of incidence of $\theta$=45° and an operating frequency of 95 GHz. In the illustrative embodiment, the slot array 30 fills a circle of diameter of 4". Thus, approximately 4000 slots are provided.

The beamsplitter 10 is oriented so that an incoming millimeter-wave beam is incident at an angle of 45° to the normal of the plate 20, as illustrated in FIG. 4.

FIG. 4 is a top view of the variable beamsplitter 10 and the incident, reflected, and transmitted waves. The incident wave is incident at an angle $\theta$ with respect to the z axis, which is the axis of the plate. The fraction of incident power transmitted by the beamsplitter 10 can be varied continuously between 0 and 100% by rotating the beamsplitter 10 through an angle of 90° about the z axis.

Figure 5:
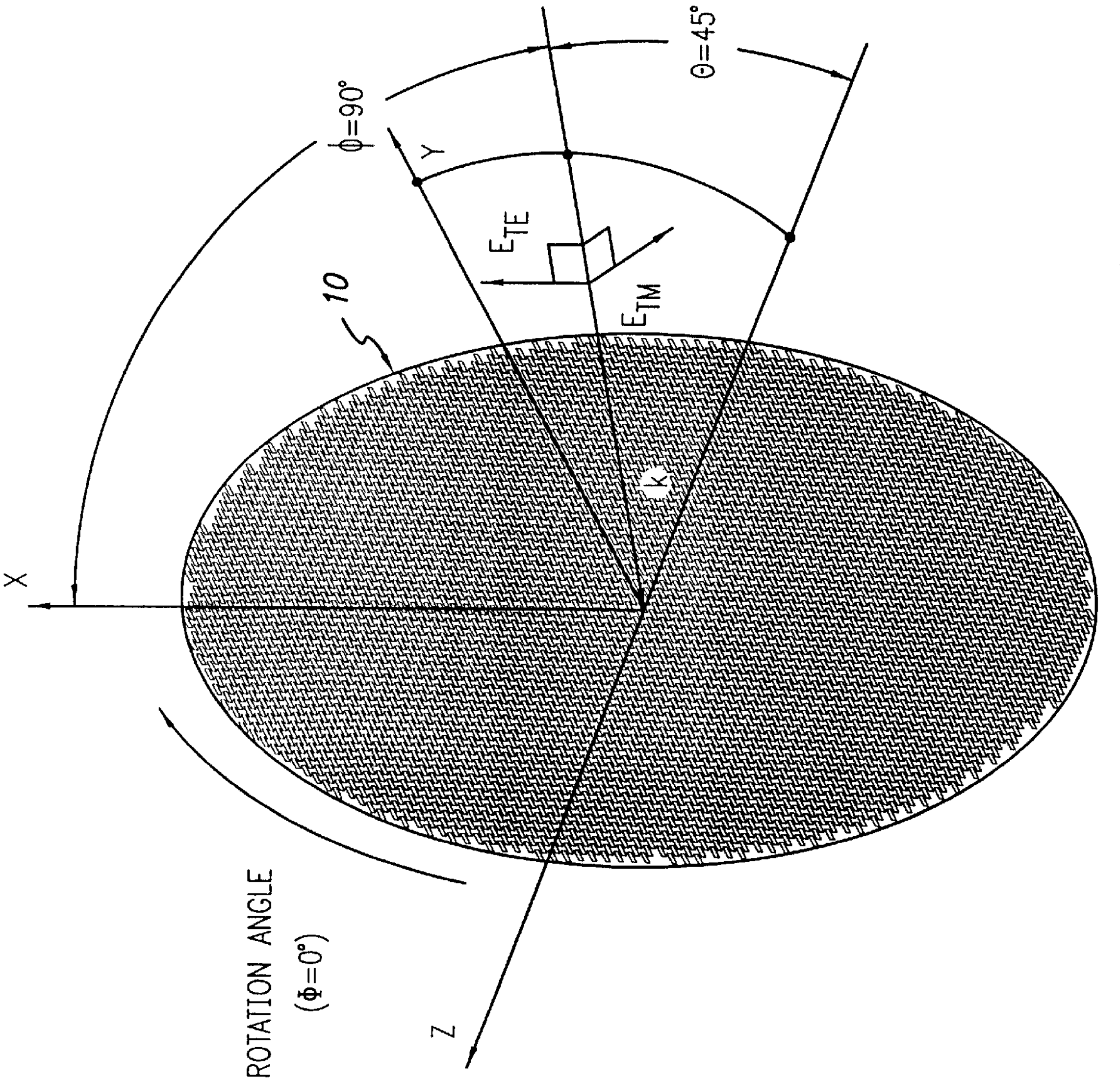
FIG. 5 is a first diagram showing beamsplitter geometry with incident TE and TM waves with a horizontal slot array orientation in accordance with the present teachings.

FIG. 5 is a first diagram showing beamsplitter geometry with incident TE (Transverse Electric) and TM (Transverse Magnetic) waves with a horizontal slot array orientation in accordance with the present teachings. In this context, TE waves are plane waves whose electric field is parallel to the plane containing the beamsplitter, and TM waves are waves whose magnetic field is parallel to the plane containing the beamsplitter. The z axis is normal to the surface of the beamsplitter 10, and is the axis of rotation for the rotation angle Φ. For the beamsplitter orientation shown in this figure, nearly 100% of an incident TE wave will be transmitted. Note that while the reflected and transmitted TE waves are not shown, their electric-field polarizations are parallel to the plane containing the beamsplitter. Likewise, the magnetic-field polarizations of the reflected and transmitted TM waves are parallel to the plane containing the beamsplitter.

When, as illustrated in FIG. 5, the polarization of the incident beam is parallel to the short axis of the slots, nearly 100% transmission is achieved at the design frequency. As the beamsplitter 10 is rotated about its axis (while maintaining a 45° angle between the incident beam and the normal to the plate) the fraction of transmitted power decreases while the reflected power increases.

Figure 6:
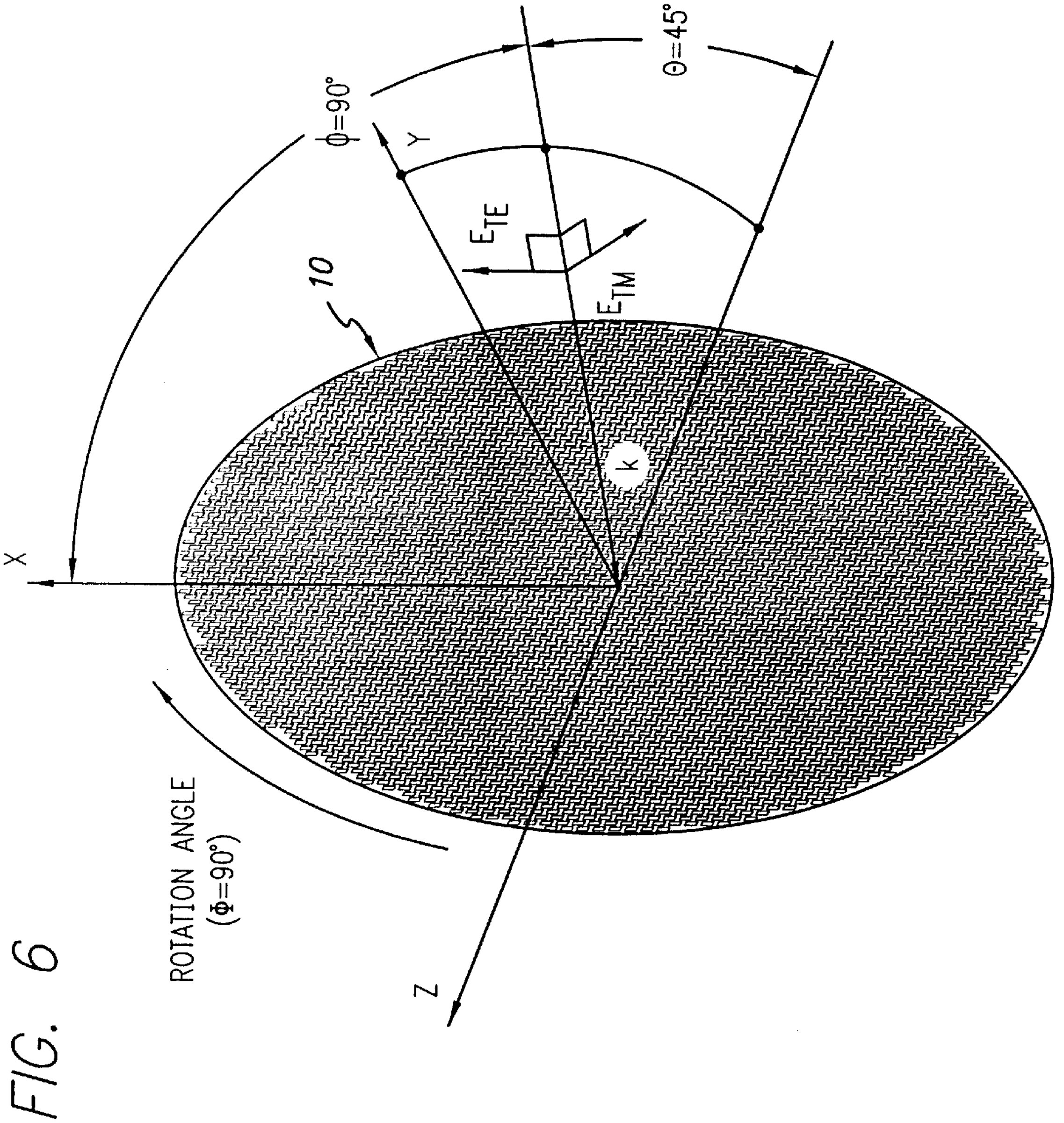
FIG. 6 is a second diagram showing beamsplitter geometry with incident TE and TM waves with a vertical slot array orientation in accordance with the present teachings.

FIG. 6 is a second diagram showing beamsplitter geometry with incident TE and TM waves with a vertical slot array orientation in accordance with the present teachings. Assuming an incident TE wave, the fraction of incident power transmitted by the beamsplitter is determined by the rotational angle of the beamsplitter about the z-axis. In FIGS. 5 and 6, the magnitude of the vector k is 2π/λ and its direction is the direction of propagation of the incident beam. For the orientation shown in FIG. 6, nearly 100% of the incident power is reflected by the beamsplitter. As illustrated in FIG. 6, at a rotation angle of 90°, at which the polarization of the incident beam is parallel to the long axis of the slots, zero power is transmitted by the beamsplitter and nearly 100% is reflected.

The performance of the beamsplitter 10 is unaffected by the angular divergence of an incident Gaussian beam so long as that divergence is not too large. Note also that for a Gaussian beam the incident power density is lowest at the edge of the beam where the deviation from θ=45° is the greatest, so that the decrease in the power transmission coefficient at angles other than 45° will have a minimal impact on the performance of the beamsplitter.

Figure 7:
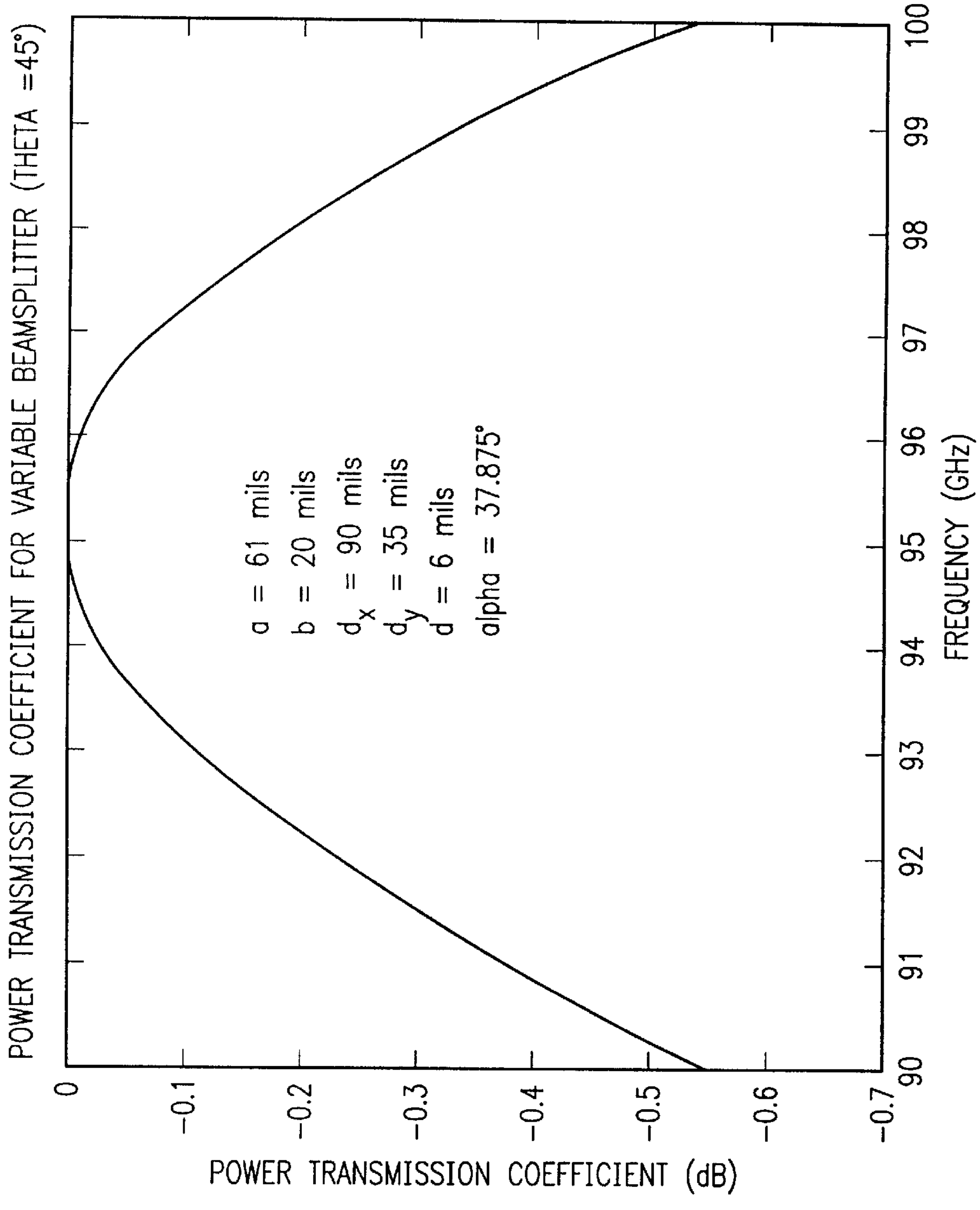
FIG. 7 is a graph showing power transmission coefficient (insertion loss) for the variable beamsplitter of the illustrative embodiment as a function of frequency.

FIG. 7 is a graph showing power transmission coefficient (insertion loss) for the variable beamsplitter 10 of the illustrative embodiment as a function of frequency. The incident wave is a $TE_{00}$ Floquet mode incident on the beamsplitter 10 at an angle of 45°. In this context, a Floquet mode is a member of a discrete set of plane waves having the same periodicity as the incident wave in planes parallel to the surface of the beamsplitter 10. In particular, if the electric field of the incident plane wave is parallel to the surface of the beamsplitter, the incident wave is proportional to the $TE_{00}$ Floquet mode. If the magnetic field of the incident plane wave is parallel to the surface of the beamsplitter, the incident wave is proportional to the $TM_{00}$ Floquet mode. The reflected and transmitted waves can be expressed as a summation of $TE_{mn}$ $TM_{mn}$ Floquet modes. The absence of grating lobes means that only the $TE_{00}$ and $TM_{00}$ Floquet modes can propagate—all other Floquet modes are evanescent. Because the slots in the array are rectangular, it is not surprising that they affect incident waves in different ways depending on the polarization of the incident wave relative to the orientation of the slots. One result of this is that the transmission coefficient varies as the beamsplitter's rotation angle is varied, which changes the orientation of the incident wave with respect to the slots and allows the perforated plate to act as a variable beamsplitter. Another result is that some degree of polarization conversion occurs, i.e., some of the incident $TE_{00}$ wave is converted to the orthogonally-polarized $TM_{00}$ mode on transmission, as is illustrated in FIG. 8.

FIGS. 8*a–c* are a series of graphs showing power transmission coefficients for the variable beamsplitter 10 of the illustrative embodiment as a function of rotation angle for different angles of incidence at an operating frequency of 95 GHz. That is, FIG. 8*a* is a graph showing power transmission coefficients for the variable beamsplitter 10 of the illustrative embodiment as a function of rotation angle for an incident angle of 40° at an operating frequency of 95 GHz.

FIG. 8*b* is a graph showing power transmission coefficients for the variable beamsplitter 10 of the illustrative embodiment as a function of rotation angle for an incident angle of 45° at an operating frequency of 95 GHz.

FIG. 8*c* is a graph showing power transmission coefficients for the variable beamsplitter 10 of the illustrative embodiment as a function of rotation angle for an incident angle of 50° at an operating frequency of 95 GHz. The similarity of the power transmission coefficients for the different angles of incidence clearly indicates that the performance of the variable beamsplitter 10 is not overly sensitive to the angle of incidence and that it can accommodate a diverging Gaussian beam so long as the angle of divergence is not too large.

In each of FIGS. 8*a, b,* and *c,* the power transmission coefficient for an incident $TE_{00}$ mode is plotted for the desired $TE_{00}$ mode, the $TM_{00}$ mode, and the total transmitted power, which is the sum of the power transmitted in the $TE_{00}$ and $TM_{00}$ modes. In each case, the beamsplitter 10 causes some polarization conversion, so that the transmitted field contains a $TM_{00}$ component in addition to the desired $TE_{00}$ component. The total transmitted power, however, may be expected to vary smoothly from its maximum to its minimum as the rotation angle of the beamsplitter 10 is increased from 0° to 90°.

FIG. 9 shows the power reflection coefficient for an incident $TE_{00}$ mode versus rotation angle for the $TE_{00}$, $TM_{00}$ and $TE_{00}$+$TM_{00}$ modes as a function of rotational angle for θ=45°. This figure shows that the reflected power can be varied in the same way as the transmitted power by varying the rotation angle Φ of the beamsplitter.

Polarization rotation is not unusual for quasi-optical components. Mirrors, for example, often rotate the polarization of the incident wave upon reflection. If required, the undesired polarization component can be removed from the reflected and transmitted beams by placing additional beamsplitters in their paths. Each additional beamsplitter is identical in construction and configuration to the variable beamsplitter 10 described above, but remains at a fixed rotation angle. The rotation angle is chosen to transmit 100% of the desired polarization component. FIG. 8*b* shows that for an incident beam in the $TE_{00}$ mode, 100% transmission occurs when the rotation angle Φ=0°, i.e., when the polarization of the incident beam is perpendicular to the slots in the plate.

Figure 10:
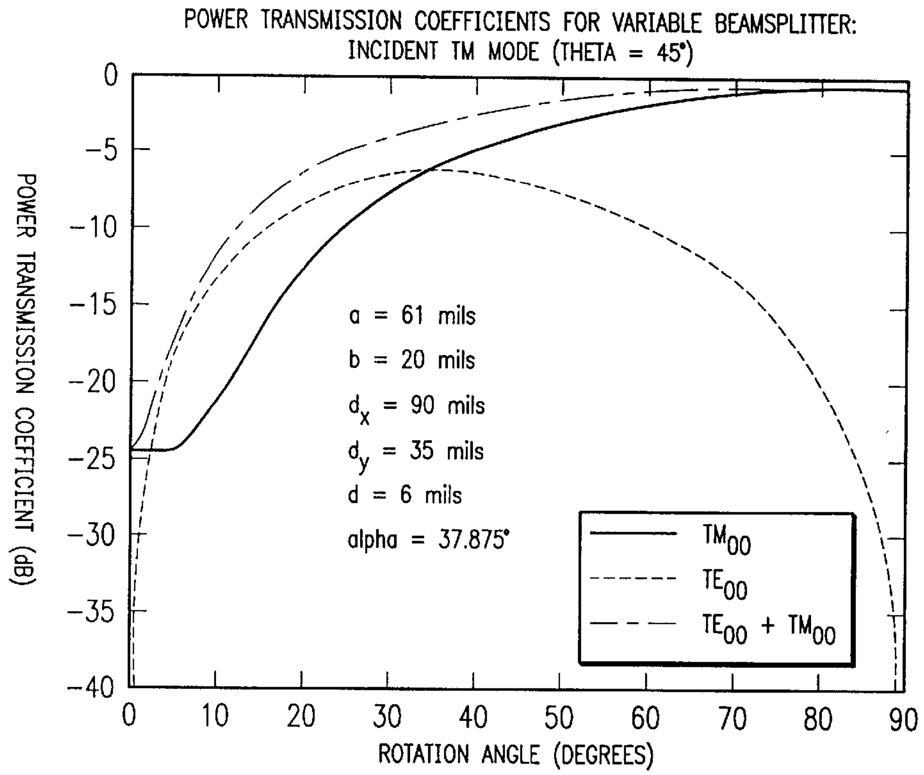
FIG. 10 is a graph showing power transmission coefficients for the variable beamsplitter of the illustrative embodiment as a function of rotation angle for a TM wave incident at an angle of 45° at an operating frequency of 95 GHz.
Figure 11:
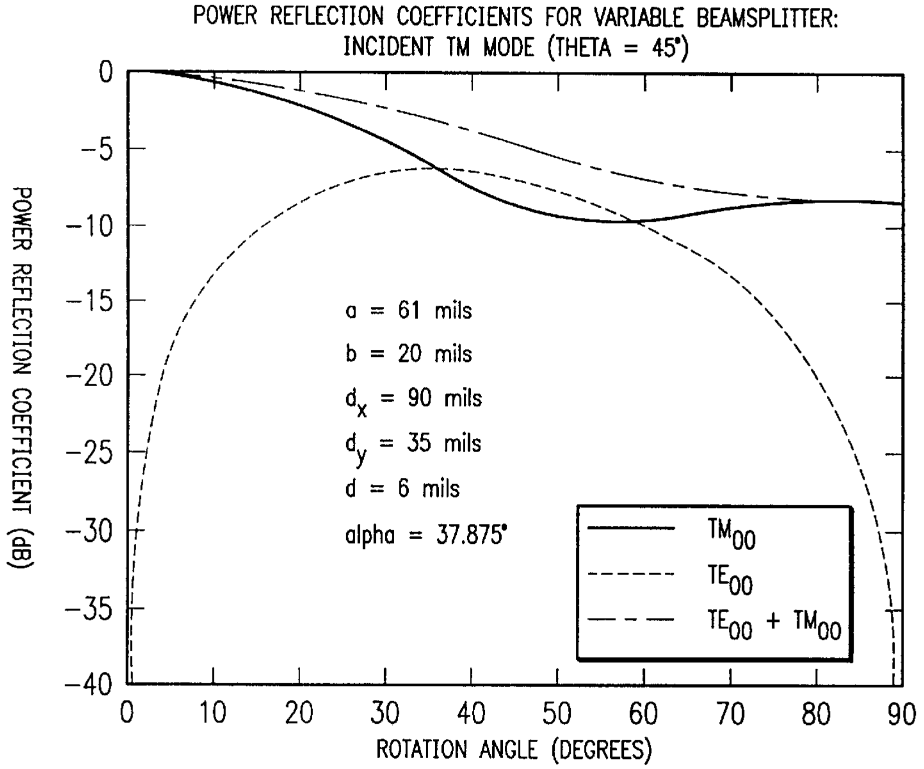
FIG. 11 is a graph showing power reflection coefficients for the variable beamsplitter of the illustrative embodiment as a function of rotation angle for a TM wave incident at an angle of 45° at an operating frequency of 95 GHz.

FIGS. 10 and 11 show the power transmission and reflection coefficients, respectively, of the variable beamsplitter of the illustrative embodiment for an incident $TM_{00}$ mode for the $TE_{00}$, $TM_{00}$ and $TE_{00}$+$TM_{00}$ modes as a function of rotation angle for θ=45°.

FIG. 10 shows that the insertion loss for an incident $TM_{00}$ mode is nearly 25 dB when the rotation angle is equal to 0°, even for a plate having a thickness of only 6 mils. If desired, the insertion loss can be increased by increasing the thickness of the plate.

FIG. 11 shows that, when the rotation angle is 0°, nearly 100% of the incident power is reflected when the incident field is in the $TM_{00}$ mode. Consequently, a beam having both $TE_{00}$ and $TM_{00}$ components incident on the beamsplitter having a fixed rotation angle of Φ=0° will transmit 100% of the $TE_{00}$ component and 0% of the $TM_{00}$ component while reflecting 100% of the $TM_{00}$ component and 0% of the $TE_{00}$ component. Therefore, the unwanted polarization component can be removed from the reflected and transmitted beams by placing a beamsplitter having a fixed rotation angle Φ=0° in the path of each beam, as illustrated in FIG. 12.

Figure 12:
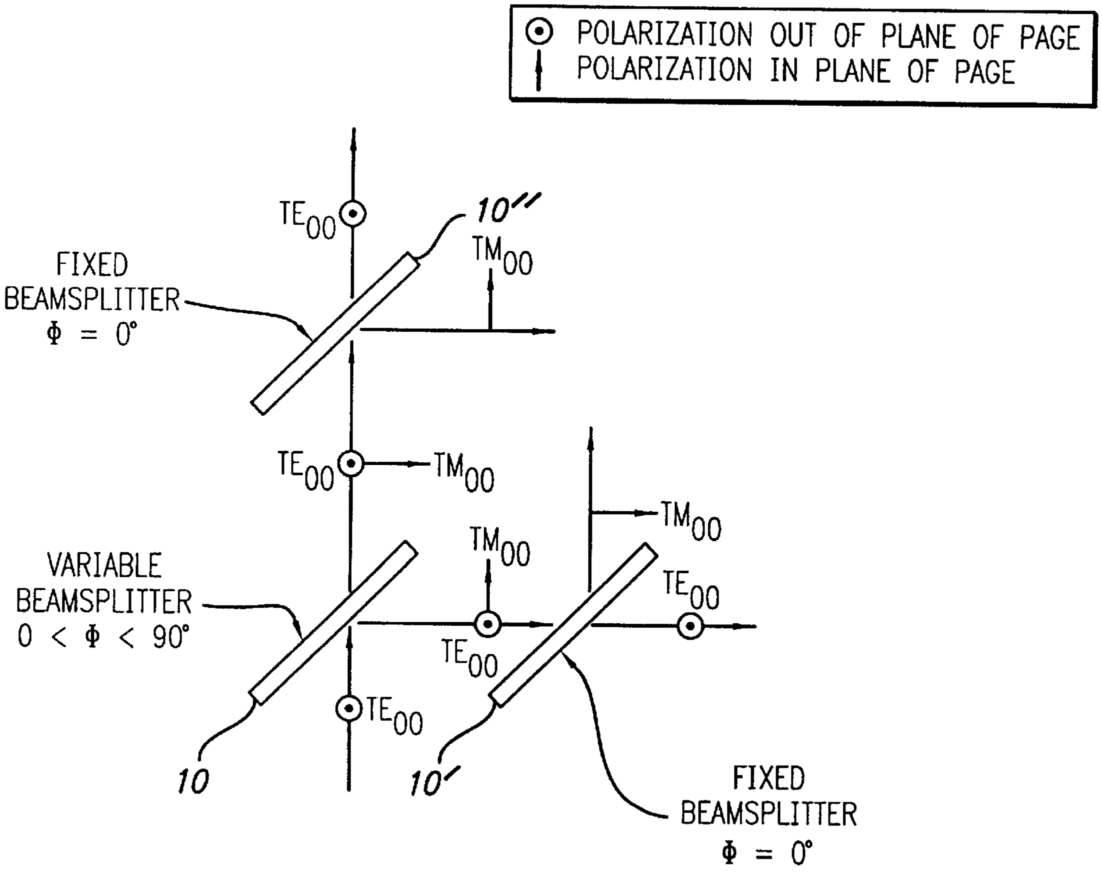
FIG. 12 is a top view of a polarization-preserving variable beamsplitter arrangement and the TE and TM waves incident thereto and reflected, and transmitted thereby.

FIG. 12 is a top view of a polarization-preserving variable beamsplitter arrangement and the TE and TM waves incident thereto and reflected, and transmitted thereby. In FIG. 12, three beamsplitters are used 10, 10' and 10". The first beamsplitter 10 is variable and the second and third beamsplitters 10' and 10" are fixed. The total transmitted power is varied from its maximum to zero by rotating the first beamsplitter 10 by 90°. The unwanted polarization is removed from the reflected and transmitted beams by placing the second and third beamsplitters 10' and 10" having a rotation angle fixed at 0° in the path of each beam.

In summary, the invention is a variable beamsplitter for use with electromagnetic energy, particularly quasi-optical millimeter-wave beams. The beamsplitter 10 consists of a conducting metal plate perforated by a periodic array of rectangular slots. By rotating the beamsplitter about its axis, power reflected and transmitted by the beamsplitter can be varied between 0% and 100% of the incident power.

Thus, the present invention has been described herein with reference to a particular embodiment for a particular application. Those having ordinary skill in the art and access to the present teachings will recognize additional modifications, applications and embodiments within the scope thereof. For example, in the illustrative implementation, the incident millimeter-wave beam impinges on the variable beamsplitter 10 at an angle of θ=45°, as shown in FIGS. 8 and 9. However, the present teachings are not limited to a 45° orientation. Those of ordinary skill in the art will be able to design a system at other incident angles θ within the scope of the present teachings. Those skilled in the art will also appreciate that as θ increases, the diameter of the beamsplitter must increase to accommodate the cross-sectional area of the incident beam.

It is therefore intended by the appended claims to cover any and all such applications, modifications and embodiments within the scope of the present invention.

Accordingly,

What is claimed is:

1. A variable power divider comprising:

a conductive plate having a plurality of slots therein, said slots being arranged to transmit, at a first level, electromagnetic energy incident on said plate at a predetermined angle when said slots are oriented at a first angle relative to an axis of said plate and to reflect, at a second level, said electromagnetic energy incident on said plate at said predetermined angle when said slots are oriented at a second angle relative to said axis; and means for supporting said plate at a fixed angle relative to said electromagnetic energy.

2. The invention of claim 1 further including means for rotating said plate from said first orientation angle to said second orientation angle relative to said axis of said plate.

3. The invention of claim 1 wherein said energy is polarized.

4. The invention of claim 3 wherein the polarization of said energy is parallel to the surface of said plate.

5. The invention of claim 1 wherein said slots are arranged in a periodic array.

6. The invention of claim 1 wherein said slots are rectangular.

7. The invention of claim 1 wherein said slots are arranged in an isosceles triangular pattern and are cut in said plate in accordance with the following relations and dimensions:

$$2\frac{\lambda}{d_x} \geq 1 + \sin\theta, \quad \frac{\lambda}{d_y} \geq 1 + \sin\theta,$$

and $$\left(\frac{\lambda}{d_x}\right)^2 + \left(\frac{\lambda}{2d_y}\right)^2 \geq (1 + \sin\theta)^2.$$

where:

$d_x$=array period along x axis;

$2d_y$=array period along y axis;

λ=the wavelength of said electromagnetic energy; and

θ=angle of incidence.

8. The invention of claim 7 wherein the slot width is 61 mils, the slot height is 20 mils, the array period along the x axis is 90 mils, the array period along the y axis is 70 mils, the plate thickness is 6 mils and α is approximately 37.875°.

9. The invention of claim 8 wherein said incident angle is 45° relative to a surface of the plate.

10. The invention of claim 9 wherein the frequency of said electromagnetic energy is 95 GHz.

11. The invention of claim 1 wherein said incident angle is 45° to a surface of the plate.

12. The invention of claim 1 wherein said electromagnetic energy is in the range of 30–300 GHz.

13. The invention of claim 1 wherein the power transported by said electromagnetic waves is greater than 100 kW.

14. The invention of claim 1 wherein said plate is circular.

15. A variable power divider comprising:

a conductive plate having a periodic array of rectangular slots therein, said slots being cut in said plate in accordance with the following relations and dimensions:

$$2\frac{\lambda}{d_x} \geq 1 + \sin\theta, \quad \frac{\lambda}{d_y} \geq 1 + \sin\theta,$$

and $$\left(\frac{\lambda}{d_x}\right)^2 + \left(\frac{\lambda}{2d_y}\right)^2 \geq (1 + \sin\theta)^2.$$

where λ the wavelength of said electromagnetic waves, $d_x$=array period along an x axis, and $2d_y$=array period along a y axis, said x and y axes being normal relative to an axis perpendicular to a surface of the conductive plate;

means for supporting said plate at a fixed angle relative to direction of propagation of said electromagnetic waves; and means for removing heat absorbed from said electromagnetic waves from edge of said plate; and means for rotating said plate from said first orientation angle to said second orientation angle relative to said axis of said plate.

16. The invention of claim 15 wherein the slot width is 61 mils, the slot height is 20 mils, the array period along the x axis is 90 mils, the array period along the y axis is 70 mils, the plate thickness is 6 mils and $\alpha$ is approximately 37.875°.

17. The invention of claim 16 wherein said incident angle is 45° to a surface of the plate.

18. The invention of claim 17 wherein the frequency of said electromagnetic waves is 95 GHz.

19. The invention of claim 15 wherein said waves are polarized.

20. The invention of claim 19 wherein the polarization of said waves is parallel to the surface of said plate.

21. The invention of claim 15 wherein said incident angle is 45° to a surface of the plate.

22. The invention of claim 15 wherein the frequency of said electromagnetic waves is in the range of 30–300 GHz.

23. The invention of claim 15 wherein the power transported by said electromagnetic waves is greater than 100 kW.

24. A method for effecting power division of electromagnetic energy including the steps of:

providing a conductive plate having a plurality of slots therein, said slots being arranged to transmit, at a first level, electromagnetic energy incident on said plate at a predetermined angle when said slots are oriented at a first angle relative to an axis of said plate and to reflect, at a second level, said electromagnetic energy incident on said plate at said predetermined angle when said slots are oriented at a second angle relative to said axis;

supporting said plate at a fixed angle relative to said electromagnetic energy; and rotating said plate from said first orientation angle to said second orientation angle relative to said axis of said plate.

* * * * *